Jan. 22, 1952  D. E. BELICH  2,583,317
LUBRICATING DEVICE
Filed May 2, 1949
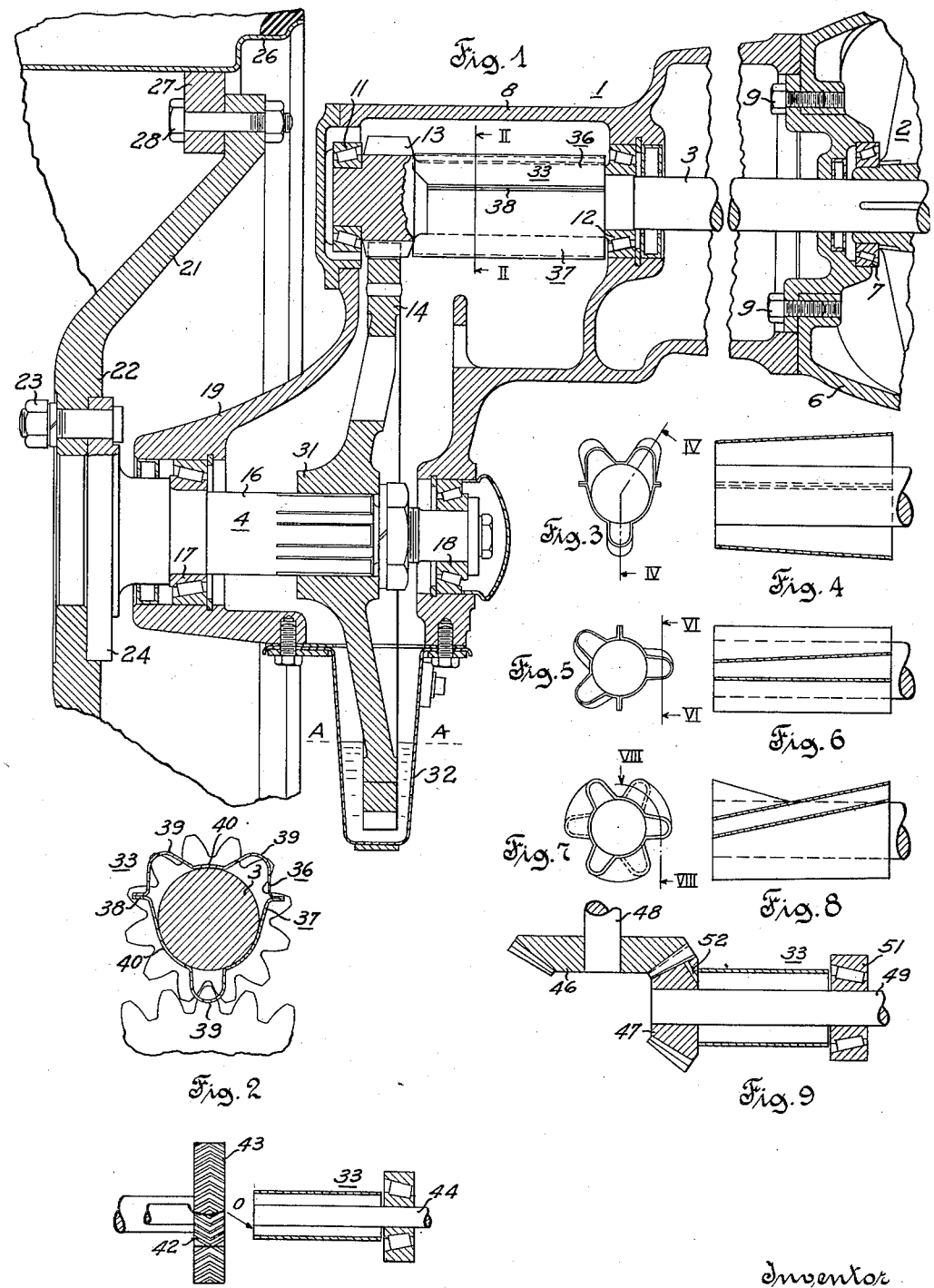
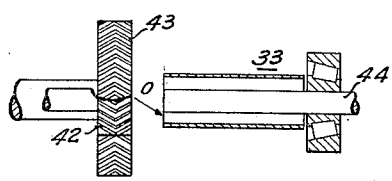
Inventor
Daniel E. Belich
by Kimball S. Wyman
Attorney Patented Jan. 22, 1952

2,583,317

UNITED STATES PATENT OFFICE 2,583,317

LUBRICATING DEVICE

Daniel E. Belich, West Allis, Wis., assignor to Allis-Chalmers Manufacturing Company, Milwaukee, Wis., a corporation of Delaware Application May 2, 1949, Serial No. 90,815

6 Claims. (Cl. 184—13)

This invention relates to lubricating means and is more particularly directed toward the lubrication of shaft bearing means remotely positioned with respect to a source of lubricant.

In the transmission of power it is often found necessary to use a relatively long shaft with an intermediate bearing support for the shaft. This presents the problem of supplying the intermediate bearing with sufficient lubricant without also filling, or partially filling, the entire shaft housing with lubricant. Various means for independent lubrication of such a bearing have been employed but have not been found too satisfactory, partly because the operator frequently forgets to lubricate this relatively small and remote part and partly because of the cost involved in providing a lubricant receiving part and reservoir for the bearing. To avoid the use of an independent lubricating means there have been devised several ways of feeding lubricant to the bearing from some well lubricated part of the machine. One of the more frequently used means of this type involves boring a hole the length of the shaft between the bearing and an oil fed gear having communication with a main source of lubricant. However, this longitudinal bore not only weakens the shaft but it is rather expensive to accomplish. Another means offered as a possible solution to the problem, in a structure wherein the shaft includes a gear thereon positioned for meshing engagement with another gear having communication with a source of lubricant, consists of a nonrotatable cylindrical sleeve coaxially positioned on the shaft between the bearing and the gear. In the latter type structure, however, it has generally been found that the space between the sleeve and shaft adjacent the oil fed gear is either too great to permit building up a pressure head sufficient to direct a flow of lubricant toward the bearing, or the space is so small that capillary action occurs with a point of equilibrium being established in the sleeve to prevent oil from flowing the length of the shaft from the gear to the bearing.

It is, therefore, a primary object of the present invention to provide a new and improved lubricant conveying device for a rotatable shaft, which device coacts with a pair of meshing gears having communication with a source of lubricant to transfer lubricant pumped by said gears to a point remote therefrom along said shaft.

Another object of this invention is to provide a lubricant conveying device for a rotatable shaft which may be readily adapted for use and installed on existing structures requiring the use of same without altering any part of the existing structure.

A still further object of this invention is to provide a structure comprising parts constructed and arranged in a novel manner and affording means for efficiently conveying lubricant along a rotatable shaft, which structure can be readily installed by a person not skilled in the art and which requires no fine adjustment of its position relative to the shaft or parts carried thereon to render it entirely effective.

It is also an object of this invention to provide a structure possessing features of construction which make is possible to achieve the above mentioned objects and which structure is simple, compact and durable and may be readily manufactured at relatively little expense.

The construction and operation of apparatus embodying the invention will become readily apparent as the disclosure progresses and particularly points out additional objects and advantages of special importance. And accordingly, the present invention may be considered as comprising the various constructions, combinations and/or subcombination of parts as is hereinafter more fully set forth in the detailed description and appended claims, reference being had to the accompanying drawings in which:

Fig. 1 is a partial rear elevation of a drop axle structure for a wheel type tractor with a portion of the axle housing broken away and parts omitted to more clearly illustrate one embodiment of the present invention;

Fig. 2 is a section taken along line II—II in Fig. 1;

Fig. 3 is an end view of a modified form of the present invention;

Fig. 4 is a section taken along line IV—IV in Fig. 3;

Fig. 5 is an end view of another modification of the invention;

Fig. 6 is a section taken along line VI—VI in Fig. 5;

Fig. 7 is an end view of still another modified form of the present invention;

Fig. 8 is a section taken along line VIII—VIII in Fig. 7;

Fig. 9 is a plan view of a schematic illustration of another manner of utilizing the invention; and Fig. 10 is a schematic illustration in plan view of still another use.

Referring particularly to Fig. 1 it is seen that one embodiment chosen to illustrate the present invention comprises a vehicle final drive assembly 1, (only one side of which is shown) including a differential mechanism 2, pinion shaft 3 and a driving wheel structure 4. Differential 2, enclosed in a housing 6, is shown only in part and may be of any conventional design functioning in the usual manner to convey power from an engine or other suitable source (not shown) to the vehicle traction means. Housing 6 includes a bearing means 7 rotatably supporting the inner end of pinion shaft 3 which is enclosed in an elongated laterally extending housing 8 detachably secured to the outer side of differential housing 6, by bolts 9 or the like, and includes bearings 11 and 12 therein rotatably supporting the outer end and an intermediate portion, respectively, of pinion shaft 3.

The outer end of shaft 3 has fixed thereto for rotation therewith a pinion gear 13 which is in constant mesh with another larger gear 14 comprising a portion of the driving wheel structure 4. Wheel structure 4 includes an axle 16 rotatably supported at either end in suitable bearings 17 and 18 carried by a depending portion 19 of housing 8. A conventional type wheel disk 21 has its hub portion 22 fixed, as by bolts 23, to a flanged outer end portion 24 of axle 16 for rotation therewith. A tire mounting rim 26 includes inwardly projecting lugs 27 affording means for detachably securing the rim in fixed relation along the outer periphery of wheel disk 21, as by bolts 28. An intermediate portion of axle 16 is splined to receive the internally splined hub portion 31 of gear 14 and in this manner gear 14, axle 16 and wheel 21 are fixed for rotation in unison. A detachable lower portion 32 of housing 18 contains lubricant to a level A—A above the lower extremity of gear 14 and it will, therefore, be apparent that when this gear rotates it carries oil from housing portion 32 up to pinion gear 13 and lubricates the latter. Lubricant which reaches the point of mesh between rotating gears 13 and 14 will be squeezed out laterally in either direction along a line generally parallel to the axes of the gears. And it will be apparent that the proximate axial relation of bearing 11 to pinion gear 13 is such that this bearing receives and is adequately lubricated by the portion of the oil thus emitted outwardly from between the meshing gears 13 and 14.

The oil being squeezed out at the point of mesh in the direction away from bearing 11 is utilized to lubricate the intermediate bearing 12 via a lubricant transfer device 33. This lubricant transfer or conveying device comprises a sleeve like part frictionally fixed to shaft 3 for rotation therewith and extends along the shaft between pinion 13 and intermediate bearing 12. Part 33 may be formed as a unitary tubular part but for ease in assembling and positioning this part on the shaft it is preferred that it be made in two pieces 36 and 37 as shown in Figs. 1 and 2 with coacting flange portions 38 on each piece affording means for readily securing the pieces together as by welding. And looking particularly at Fig. 2 it is noted that lubricant conveying part 33 is formed with a plurality of longitudinal channels 39 and that the inner surface of the portions 40 of the sleeve intermediate these channels are fitted tightly against the outer surface of shaft 3.

In operation of the final drive, when power is delivered from the engine through the transmission (both of which are conventional and not shown) and differential 2 to pinion shaft 3 and gear 13, bull gear 14 due to its driven relation with pinion 13 rotates in the oil bath contained in housing portion 32 and an appreciable amount of oil clings to the teeth and is carried up to the top of the gear. As each tooth in turn reaches the point of mesh with pinion gear 13 the oil clinging thereto is squeezed out from between the meshing teeth. Since the gears illustrated in Figs. 1 and 2 are spur gears, i. e., gears having teeth parallel to the gear axis, the oil squeezed out on either side is propelled generally along a line parallel to the axis of the gears. And, since longitudinal channels 39 are positioned to move opposite the point of mesh each receives a quantity of oil from the gears as it is rotated by shaft 3 to a point opposite this meshing point. As more and more oil is pumped into a channel by the gears the pressure head of the oil increases until sufficiently great to cause a flow of the oil in channel 39 to intermediate bearing 12.

In order to build up a pressure head of oil in the gear end of channel 39 sufficient to overcome surface tension and to overcome the tendency to gravitate back toward gear 13 and thus run out of the channel after channel 39 has passed the point of mesh, it is necessary that the cross sectional area of the channel be made relatively small and yet not small enough to cause capillary action of the oil in the channel with a resulting equilibrium at some point short of the bearing to be lubricated. Also, it has been found desirable to have the gear end opening in channel 39 less than the width of two gear teeth in order that the oil does not flow out of the channel toward the gears supplying the lubricant at the same time it is being pumped into the channel. Then too, the speed of the gears, the size thereof, and the viscosity of the lubricant are also factors which enter into the design of an efficient oil conveying tube. And because of the many variables present, it would be extremely difficult, if not impossible, to develop a formula which would be generally satisfactory for determining the proper size of conveying channel for different applications.

However, a proper design has been determined empirically as evidenced by the illustrated case (Figs. 1 and 2) wherein it was found that for 1¾ inch shaft rotating at between 100 and 350 R. P. M. with a bearing thereon approximately 8½ inches from two meshing spur gears (pinion with 12 teeth and a pitch of 5 on the 1¾ inch shaft and a meshing gear with 69 teeth and a pitch of 5 on a second shaft), a series of three channels each having a cross sectional area of approximately ¼ square inch is effective to lubricate the remote bearing. In this connection, it is most desirable to have the adjacent end opening of the channel centered with respect to the opening between two adjoining teeth on gear 13 so that a maximum amount of oil will be squeezed into channel 39. However, this centering of the channel necessarily involves additional time and expense in installation, and in order to avoid this added expense the illustrated lubricant conveying tube 33 is made with three channels 39 unequally spaced circumferentially of supporting shaft 3. In this case the chosen spacing permits tube 33 to be placed on shaft 3 without regard to the position of channels 39 relative to the pinion gear 13, and there is always at least one channel disposed with a major portion of its end opening opposite a point of mesh of the teeth. Thus tube 33 may be installed quickly and yet function efficiently to receive the oil pumped by gears 13 and 14. And in this connection some advantage may be obtained by employing a channel which diverges radially toward its discharge end (Figs. 3 and 4) in order to utilize centrifugal force as a flow inducing aid. In addition, it may also be desirable to position the channel in skewed relation (Figs. 7 and 8) on a shaft with its oil receiving end disposed in leading relation to its discharge end as such positioning of the channel is also conducive to increasing oil flow therethrough. Still another flow inducing aid is suggested in Figs. 5 and 6 wherein the lagging side of the channel is angularly positioned with respect to the leading side to present an opening at the discharge end of the channel which is somewhat greater than that at the oil receiving end.

Looking now to Figs. 9 and 10 it will be seen that the tube illustrated in Fig. 1, as well as those shown in Figs. 3 to 8, may be used under various circumstances and are not limited in their scope of utility to the particular arrangement shown in Fig. 1. For instance, in Fig. 10 the gears supplying the oil pumping action are herringbone gears 42 and 43 with the latter having communication with an oil bath (not shown). Neither gear is located on the shaft 44 receiving the lubricant. Due to the shape of the gear teeth the oil is squeezed out at the point of mesh at an angle with respect to the gear axes and along a path generally designated by the line "O." Oil conveying tube 33 is positioned on shaft 44, which is spaced from gears 42 and 43, with the channel openings in the path of oil which is being pumped or squirted thereby.

Still another application is shown in Fig. 9 wherein bevel gears 46 and 47 are mounted on shafts 48 and 49 disposed at right angles with respect to each other. Gear 46 is in communication with an oil bath (not shown) and, therefore, oil is carried by gear teeth thereof to the point of mesh with gear 47. Shaft 49 is supported in part by a bearing means 51 spaced from the gear end of the shaft and to lubricate this bearing one or more oil holes 52 are drilled through the gear 47, generally at right angles to the line of mesh, and lubricant conveying tube 33 is positioned on shaft 49 with one or more channels communicating with oil holes 52. Thus when the gear teeth adjacent oil hole 52 mesh with teeth on gear 46 a portion of the oil is pumped into the lubricant conveying channel through the oil hole.

And with the foregoing information available, anyone skilled in the art can readily utilize the invention in different applications, having in mind that the number of channels may be varied as desired. The illustrated applications of the present invention are by no means exhaustive but rather are intended to depict some uses for such a device under different circumstances. And it should be understood that it is not intended to limit this invention to the exact constructions shown since other modifications within the scope of the accompanying claims may be readily apparent to one skilled in the art.

It is claimed and desired to secure by Letters Patent:

1. In combination with a shaft rotatably supported in a bearing means, a power transmitting means including a pair of gears in meshing relation with respect to each other, a source of lubricant communicating with one of said gears, and a lubricant conveying device comprising a tubular part mounted on said shaft in enclosing relation thereto, said tubular part having elongated first portions fixedly engaging said shaft at circumferentially spaced positions thereon and having elongated second portions intermediate said first portions and spaced outwardly from said shaft to form a plurality of channels along the shaft, said channels being positioned to receive lubricant discharged from the meshing teeth of said gears and to deliver said lubricant to said bearing means.

2. In combination with a shaft rotatably supported in a bearing means, a power transmitting means including a first gear nonrotatably mounted on a portion of said shaft remote from said bearing means and a second gear in mesh with said first gear, a source of lubricant communicating with said second gear, and a lubricant conveying device comprising a tubular part mounted on said shaft in enclosing relation thereto, said tubular part having elongated first portions fixedly engaging said shaft at circumferentially spaced positions thereon and having elongated second portions intermediate said first portions spaced outwardly from said shaft to form a plurality of channels along the shaft, said longitudinal channels being unequally spaced circumferentially of said shaft and being positioned to receive lubricant discharged from the meshing teeth of said gears and to deliver said lubricant to said bearing means.

3. In combination with a shaft rotatably supported in a bearing means, a power transmitting means including a first gear nonrotatably mounted on a portion of said shaft remote from said bearing means and a second gear in mesh with said first gear, a source of lubricant communicating with said second gear, and a lubricant conveying device comprising a tubular part mounted on said shaft in enclosing relation thereto, said tubular part having elongated first portions fixedly engaging said shaft at circumferentially spaced positions thereon and having elongated second portions intermediate said first portions spaced outwardly from said shaft to form a plurality of channels along the shaft, said channels being formed to diverge radially outward from said shaft to present a larger opening at the one end thereof positioned adjacent said bearing means with respect to the other end positioned adjacent the meshing teeth of said gears.

4. In combination with a shaft rotatably supported in a bearing means, a power transmitting means including a pair of gears in meshing relation to each other, a source of lubricant communicating with one of said gears, and a lubricant conveying device comprising a part having portions contacting said shaft at circumferentially spaced positions on said shaft and extending longitudinally thereof with intermediate portions of said part being spaced outwardly from said shaft to form a channel, said channel comprising side portions positioned in angular relation with respect to each other so that the spacing of said side portions circumferentially of said shaft is less at one end of said channel than at the other end, said channel being disposed with said one end adjacent said gears and said other end adjacent said bearing means.

5. In combination with a shaft rotatably supported in a bearing means, a power transmitting means including a first gear nonrotatably mounted on a portion of said shaft remote from said bearing means and a second gear in mesh with said first gear, a source of lubricant communicating with said second gear, and a lubricant conveying device comprising a tubular part mounted on said shaft in enclosing relation thereto, said tubular part having elongated first portions fixedly engaging said shaft at circumferentially spaced positions thereon and having elongated second portions intermediate said first portions spaced outwardly from said shaft to form a plurality of channels along the shaft, each of said channels comprising opposite side portions positioned in angular relation with respect to each other so that the spacing of said side portions circumferentially of said shaft is less at one end of each of said channels than at the other end, said channels being positioned with said one end to receive lubricant discharged from the meshing teeth of said gears and with said other end to deliver said lubricant to said bearing means.

6. In combination with a shaft rotatably supported in a bearing means, a power transmitting means including a pair of gears in meshing relation to each other, a source of lubricant communicating with one of said gears, and a lubricant conveying device comprising a part having portions contacting said shaft at circumferentially spaced positions on said shaft and extending longitudinally thereof with intermediate portions of said part being spaced outwardly from said shaft to form a channel, said channel having one end positioned to receive lubricant discharged from the meshing teeth of said gears and having its other end positioned to deliver lubricant to said bearing means, said channel being positioned along said shaft in skewed relation thereto.

DANIEL E. BELICH.

REFERENCES CITED

The following references are of record in the file of this patent:

UNITED STATES PATENTS

| Number | Name | Date |
|---|---|---|
| 1,933,684 | Randolph | Nov. 7, 1933 |
| 2,283,357 | Finley | May 19, 1942 |
| 2,489,699 | Clark | Nov. 29, 1949 |

FOREIGN PATENTS

| Number | Country | Date |
|---|---|---|
| 521,833 | France | Mar. 16, 1921 |